US 7,979,251 B2

(12) United States Patent
Jakobsen et al.

(10) Patent No.: US 7,979,251 B2
(45) Date of Patent: Jul. 12, 2011

(54) AUTOMATIC GENERATION OF BUILDING INSTRUCTIONS FOR BUILDING ELEMENT MODELS

(75) Inventors: Jakob Sprogoe Jakobsen, Billund (DK); Ole Juul Kristensen, Aarhus C (DK); Jacob Allerelli, Odense C (DK); Jesper Martin Ernstvang, Vejle (DK)

(73) Assignee: Lego A/S, Billund (DK)

( * ) Notice: Subject to any disclaimer, the term of this patent is extended or adjusted under 35 U.S.C. 154(b) by 1097 days.

(21) Appl. No.: 11/724,915

(22) Filed: Mar. 16, 2007

(65) Prior Publication Data

US 2008/0228450 A1    Sep. 18, 2008

(51) Int. Cl.
*G06F 9/455* (2006.01)
(52) U.S. Cl. .............................................. 703/6; 700/95
(58) Field of Classification Search .................. 703/1, 6, 703/7, 2; 700/108, 95, 98; 707/4; 702/98; 345/474
See application file for complete search history.

(56) References Cited

U.S. PATENT DOCUMENTS

| | | | |
|---|---|---|---|
| 6,004,021 A | 12/1999 | Rothbarth | |
| 6,389,375 B1 | 5/2002 | Thomsen et al. | |
| 6,801,822 B1 * | 10/2004 | Fujiwara et al. | 700/108 |
| 6,826,500 B2 * | 11/2004 | Linthicum et al. | 702/98 |
| 7,660,641 B2 * | 2/2010 | Bournas et al. | 700/95 |
| 2002/0123812 A1 * | 9/2002 | Jayaram et al. | 700/98 |
| 2003/0097195 A1 * | 5/2003 | Yamrom et al. | 700/95 |
| 2004/0236539 A1 | 11/2004 | Clark et al. | |
| 2004/0249809 A1 * | 12/2004 | Ramani et al. | 707/4 |
| 2005/0038636 A1 * | 2/2005 | Wakelam et al. | 703/1 |
| 2006/0136180 A1 * | 6/2006 | Hansen et al. | 703/1 |
| 2007/0070073 A1 * | 3/2007 | Davis et al. | 345/474 |
| 2008/0147223 A1 * | 6/2008 | Erickson et al. | 700/108 |
| 2008/0228450 A1 * | 9/2008 | Jakobsen et al. | 703/2 |

FOREIGN PATENT DOCUMENTS

| | | |
|---|---|---|
| WO | WO 98/44459 A | 10/1998 |
| WO | WO 2004/034333 | 4/2004 |
| WO | WO 2005/124696 | 12/2005 |

OTHER PUBLICATIONS

Yu et al., "Structure representation for concurrent analysis of product assembly and disassembly", Expert systems with applications, 2006.*
Eubanks et al., "Data representation for serviceability design", The Ohio State University, 1992.*
"Designing Effective Step-By-Step Assembly Instructions," M. Agrawala et al., http://graphics.stanford/edu/papers/assembly-instructions.
"Computer-Aided Generation Of Building Instructions For Lego Models," Jacob Allerelli.

(Continued)

*Primary Examiner* — Kandasamy Thangavelu
(74) *Attorney, Agent, or Firm* — Day Pitney LLP

(57) ABSTRACT

A computer-implemented method of generating building instructions for a building element model, the model including a plurality of building elements, the building instructions being indicative of a sequential order of construction steps for constructing the building element model, each construction step including adding at least one building element to the building element model. The method comprises determining, from a digital representation of the building element model, a sequential order of deconstruction steps for deconstructing the building element model into building elements, each deconstruction step including removing at least one building element from the building element model; and inverting the determined sequential order of deconstruction steps to obtain the sequential order of construction steps.

42 Claims, 8 Drawing Sheets

OTHER PUBLICATIONS

"Virtual Lego," Courtney T., Bliss S., Herrera A., Lego Cad: Simple Machine Cybertoys Online, Feb. 3, 1999. htt://web.archive.org/web/19990203094432/htt://www.workshop3d.com/cybertoys/legocad.htm.

"Automatic generation of Assembly Instructions Using STEP," Mok S M et al.

"MLCAD, LDraw.org: The Centralized Site For The LDraw Family of Lego CAD Software," Tim Courtney, Written 1999, Posted Sep. 12, 2003, Printed Sep. 11, 2006. http://www.ldraw.org/modules.php? op=modload&name=Reviews&life=indext&reg=showcontent&id=4.

"Announcing LEGO Digital Designer 1.0," Todd Lehman, Apr. 30, 2003, http://news.lugnet.com/cad/?n=9835.

Amazon.com: Lego Software Power Tools, With LDraw, MLCad, and LPub (Paperback), http://www.amazon.com/software-power-tools-LDraw-MLCad/dp/193118366760.

MLCad Tutorial, Sebastian Stein, http://www.hpfsc.de/mIcdtut/tuteng.html.

Lego Digital Designer: Virtual Building Software 2006, http://ldd.lego.com.

MLCad from Wikipedia, last updated: Sep. 6, 2006, Printed Sep. 22, 2006, http/en.wikipedia.org(wiki/MLCAD.

* cited by examiner

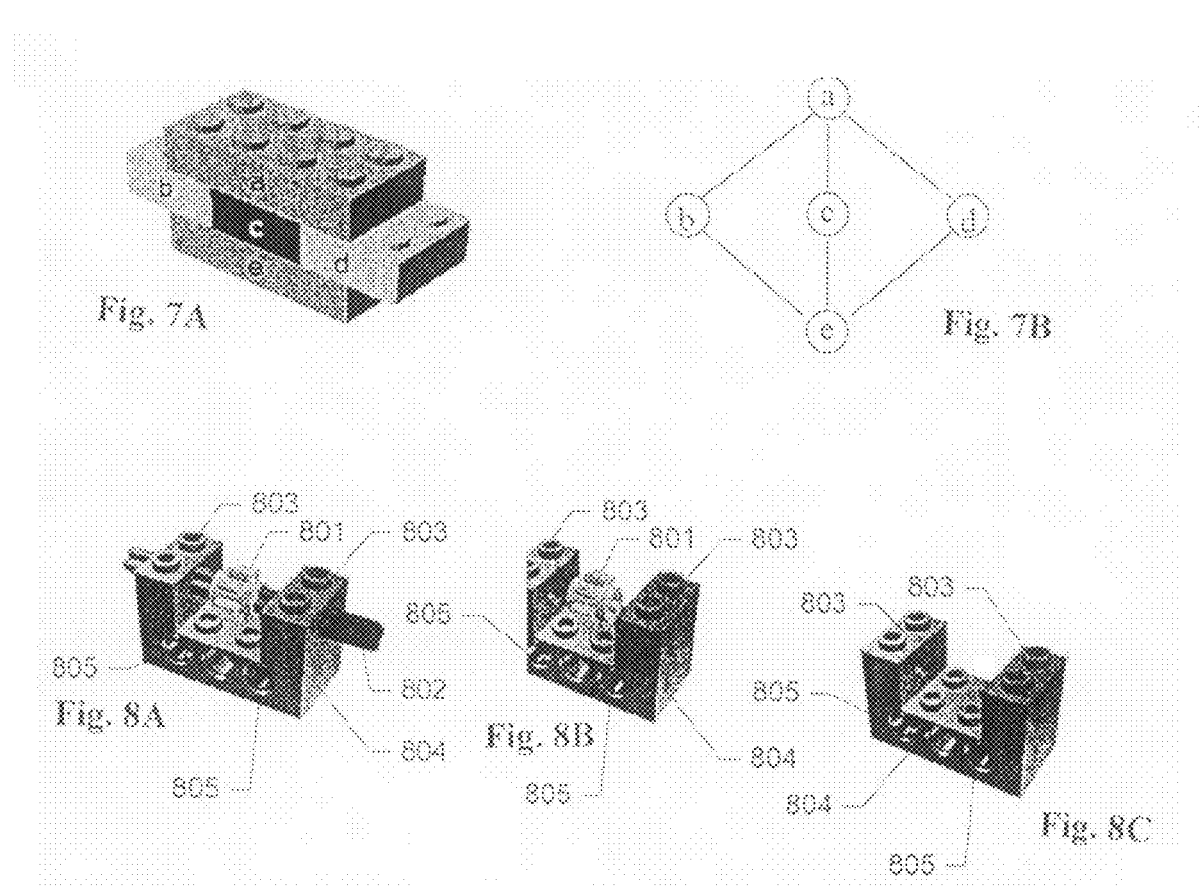

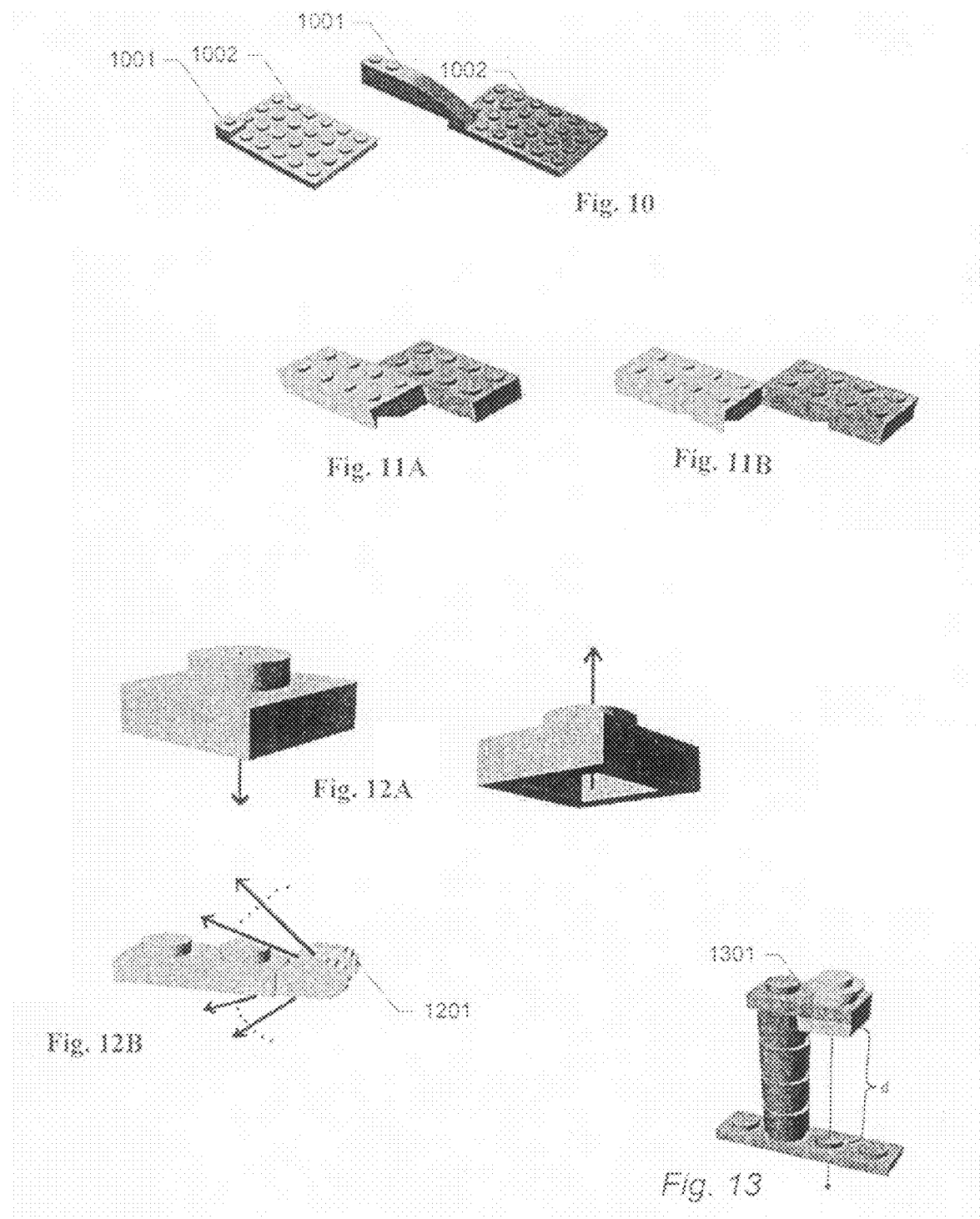

AUTOMATIC GENERATION OF BUILDING INSTRUCTIONS FOR BUILDING ELEMENT MODELS

TECHNICAL FIELD

The present invention relates to the generation of building instructions for building element models.

SUMMARY

There are various known types of modelling concepts of physical construction toy sets. Especially modular or semi-modular concepts are very popular as they provide an interesting and challenging play experience. Typically, these concepts provide a set of pre-manufactured building elements that can be interconnected with each other in some predetermined way by means of connection elements of the pre-manufactured elements. The pre-manufactured building elements resemble well-known objects adapted to a specific modelling task. Thus in e.g. building a model of a house the building elements may resemble wall bricks, roof tiles, doors, and windows. The object of selecting the building elements in this way is that the work involved with the building of a model of a house is reduced significantly compared to a situation where all details of the house are to be defined each time a new model should be made. However, the complete freedom in building a house or another object is traded off for the simplicity of building the model.

For example, the toy construction sets available under the name LEGO comprise a plurality of different types of interconnectable building elements having protrusions and corresponding cavities as connecting elements. The connecting elements are arranged according to regular grid patterns, thereby allowing a wide variety of interconnections between building elements.

Typically, such toy construction sets comprise a set of building elements suitable for creating one or more building element models, e.g. an animal, a robot, or another creature, a car, an airplane, a spaceship, a building, or the like. Typically, a construction set further includes printed building instructions or assembly instructions that illustrate how to construct a certain model from the building elements of the set. Nevertheless, it is an interesting feature of such construction sets that they inspire children to create their own models.

Typically, the building instructions enclosed in a toy construction set comprise a sequence of pictures illustrating step by step how and in which order to add the building elements to the model. Such building instructions have the advantage that they are easy to follow, even for children without great experience in toy construction sets and/or without reading skills.

Generally a building instruction for a model may be regarded as a sequence of construction steps and substeps in which building elements are assembled. The sequence starts with one or more initial building elements and develops over a series of steps into the full assembly which is a construction of the model. In each step either a single building element or a sub-assembly of building elements is added. For the purpose of the present description, the term sub-assembly refers to a subset of interconnected building elements of the building element model. Adding a sub-assembly rather than a building element may thus involve a subordinate building instruction for that sub-assembly to be added to the main building instruction. For the purpose of the present description, such a subordinate building instruction will also be called a substep. Thus, the sequence of steps may generally be represented as a branched tree of steps where each branch contains subordinate building instructions.

Previously, such building instructions have been generated manually, e.g. by manually determining reasonable building steps, drawing the corresponding instructions in a CAD system, and finally printing the thus generated instructions. Even though such building instructions are of high-quality, i.e. are easy to follow, the above production processes have the disadvantage that they require great skill and are labour-intensive. As a consequence, building instructions typically only exist for building element models designed by the manufacturer of the building elements. In particular, the above prior art methods for generating building instructions are not suitable for children who wish to produce building instructions for their own models, which would allow them to share their models with their friends.

More recently, building instructions have been generated in electronic rather than in printed form. In particular, animated building instructions where the more complicated building steps are animated. The production of such building instructions, however, still involves a design and a drawing/animation of the building steps by skilled designers.

In a complex system such as the LEGO system, the number of possible building instructions for a model grows exponentially with the number of building elements in the model. Consequently, it is generally a problem for an automatic building instruction process to determine a high-quality set of instructions out of the virtually infinite number of possible building instructions for a given model. It is thus desirable to provide an automated process that generates workable, easy-to-follow instructions even for complex models. It is further desirable to provide such a process generates building instructions within a reasonable time on a reasonable computational hardware.

It is further desirable to provide a method for generating building instructions that is suitable for children who wish to produce building instructions for their own models, which would allow them to share their models with their friends and further improve the play experience. In particular, it is desirable to provide methods that require little or no user interaction and inputs that are readily available to the user.

The design of effective, easy-to-understand step-by-step building instructions has also been the subject of some research. The Internet publication "Designing Effective Step-by-Step Assembly Instructions", by M. Agrawala et al., retrieved from http://graphics.stanford.edu/papers/assembly-_instructions/, describes design principles for effective assembly instructions based on cognitive psychology. This article further discloses a computerised system for generating assembly instructions based on information about each of the objects to be assembled, the assembly orientation and the camera viewpoint for the graphical rendering, grouping information, information about fasteners, the significance of the parts, symmetries, and about constraints on the order of assembly. Based on this input, the system calculates a sequence of assembly steps based on an extensive search algorithm taking the given constraints into consideration. It is a problem of the above prior art system that it is computationally expensive and requires complicated input data, thus requiring a high degree of abstract thinking from the user.

Published international patent application WO 2005/124696 discloses an automated process for generating building instructions for a virtual building model in which the building instructions utilise a sequential order of steps determined by the order of construction steps used by a user during construction of the virtual model in a virtual construction environment. Even though this prior art method provides an easy-to-use automated process, it remains a problem to increase the quality of automatically generated building instructions.

Disclosed herein is a computer-implemented method of generating building instructions for a building element model, the model including a plurality of building elements, the building instructions being indicative of a sequential order of construction steps for constructing the building element model, each construction step including adding at least one building element to the building element model; the method comprising:

determining, from a digital representation of the building element model, a sequential order of deconstruction steps for deconstructing the building element model into building elements, each deconstruction step including removing at least one building element from the building element model;
  inverting the determined sequential order of deconstruction steps to obtain the sequential order of construction steps.

Hence, it has been realised that a sequence of construction steps may be efficiently determined by first determining a sequence of deconstruction steps and then reversing the order of deconstruction steps to obtain a sequence of construction steps.

A building deconstruction for a model may be regarded as a sequence/iterative process of steps and substeps in which building elements are disassembled. The sequence starts with the full model and proceeds over a series of steps until all building elements have been disconnected from the model. In each step either a single building element or a sub-assembly of building elements is disconnected. Disconnecting a sub-assembly rather than a building element thus involves a subordinate building deconstruction for that sub-assembly to be associated with the main building deconstruction. Such subordinate building deconstruction will also be called a substep. Thus, similar to building construction, the sequence of steps of the deconstruction process is generally a branched tree of steps where each branch contains subordinate building deconstructions.

If a building deconstruction can be found, it can be reversed, yielding a building instruction, just as it is possible to deconstruct a model by going through a building instruction backwards. Furthermore, it has turned out that searching for a deconstruction sequence that fulfils certain selection criteria is possible with reasonable computational resources and results in high-quality building instructions.

It has further turned out that the building instructions generated by this computationally simple method are easy to understand by users, in particular children.

Furthermore, as the only input to the building instruction is the digital representation of a building element model, e.g. as recorded during a virtual model generation process, the building instructions are easy for a user to generate without requiring the user to posses design skills or abstract knowledge about geometry, constraints, etc. Furthermore, the generation of the building instructions is independent of the order in which the user actually has constructed the virtual model. This may be advantageous, since a virtual construction environment may allow the performance of construction steps in an order that may be difficult or even impossible to perform with a physical, real-world model.

In some embodiments, determining the sequential order of deconstruction steps comprises performing an iterative process, wherein an iteration of the iterative process comprises:

obtaining a previous part-model resulting from a previous iteration;
  determining at least one building element to disconnect from the previous part-model resulting in a new part-model.

Hence, the process starts with the complete model and generates a sequence of part-models by removing, in each iteration, one or more building elements. Whereas a search for high quality building instructions generally requires backtracking, and thus is computationally very expensive and even prohibitively expensive for large models, it has turned out that building deconstruction can be achieved by a one-pass algorithm which is much less demanding on the computational hardware.

Generally, in a complex building system, such as the toy building system marketed under the name LEGO, it may not be possible for some models to be deconstructed building element by building element, because some building elements may lock each other in such a way that no single building element can be disconnected. However, generally all models can be disconnected by removing, in each step, either a single building element or a sub-assembly of building elements.

Accordingly, in some embodiments, determining at least one building element includes:

determining a set of candidate sub-assemblies of the previous part-model, each candidate sub-assembly including respective interconnected building elements of the previous part-model;
  selecting, according to a first set of predetermined selection criteria, either a single building element or one of the determined set of candidate sub-assemblies to be disconnected from the previous part-model resulting in the new part-model.

Hence, in some embodiments, sub-assemblies are treated as pseudo-building elements for the purpose of the deconstruction sequence. However, the number of possible sub-assemblies of a building element model generally grows exponentially with the number of building elements in the model. Consequently, even for moderate sized models a top-down approach for searching though all possible sub-assemblies and selecting, given certain criteria, one sub-assembly to be disconnected is computationally prohibitively expensive, even though such an approach may well be feasible when exclusively considering removal of single building elements.

In some embodiments, the method described herein combines the above top-down approach with a bottom-up approach for generating candidate sub-assemblies to be subjected to the top-down search. The generation of candidate sub-assembly may be performed according to a set of one or more generator sub-processes or a second set of selection criteria, thus resulting in a subset of candidate sub-assemblies of the set of all possible sub-assemblies of the model. Hence, the bottom-up approach is used to prune the search space prior to performing the computationally expensive top-down approach.

The above dissecting of top-down search and bottom-up generation result in a process that is computationally less expensive, programmatically easier, and easily extendible, e.g. by adding additional generator sub-processes for generating candidate sub-assemblies.

Furthermore, the above approach provides an improved control, since it provides a mechanism for controlling the number of candidate sub-assembly to generate, thus providing a mechanism for trading off computational cost against quality of the resulting building instructions and for adjusting the size of the pool of candidates to any given hardware and time requirements.

In some embodiments, at least one of the second set of selection criteria includes determining a connection strength of the connection of one or more of the candidate sub-assemblies with the previous part-model. Consequently, sub-assemblies are generated/selected according to the strength of their connection to the remainder of the previous part-model. It has turned out that this selection/generation strategy for sub-assemblies results in particularly high-quality building instructions.

Additional or alternative selection rules for efficiently selecting candidate sub-assemblies comprise determining changes in the building direction and/or sub-assemblies that are movably connected to the previous part-model, e.g. by means of a hinge or joint connection, a slider, etc.

In some embodiments the method comprises representing the previous part-model by a data structure indicative of a graph, e.g. an undirected graph, including nodes indicative of respective building elements of the previous part-model and edges connecting respective nodes indicative of connections between corresponding building elements. By representing the previous part-model as a graph, graph partitioning techniques and other techniques known from graph theory (see e.g. "Graph Theory and Its Applications" by Jonathan L. Gross and Jay Yellen, Chapman & Hall/CRC, second edition, 2006) may be used to efficiently identify suitable candidate sub-assemblies, e.g. by identifying articulation nodes or articulation pairs in the graph, so as to identify sub-assemblies that are attached to the remainder of the previous part-model by a single articulation building element or by a pair of building elements. Hence, a model of interconnected building elements corresponds to a connected graph, and a sub-assembly corresponds to a connected subgraph.

The nodes and/or edges of the graph may have one or more respective attributes associated to them corresponding to attributes of the corresponding building elements and connections, respectively. For example, nodes of the graph may have one or more of the following attributes attached to them: building element type, building element volume, building element shape/geometry, volume building element mass, a bounding box of the building element, a position of the building element in a coordinate system, a main building direction associated with the building element, the positions, types, and/or directions of connection elements of the building element, and/or the like. Similarly, edges of the graph may have one or more of the following attributes associated with them: connection type, connection strength, direction of connection, and/or the like. When the edges of the graph have respective weights/values associated with them, indicative of the respective connection strengths of the connections, particularly efficient graph partitioning methods, such as methods for finding minimum cuts may be used to obtain high-quality building instructions.

In some embodiments, each building element comprises one or more connection elements adapted to engage with one or more corresponding connection elements of another building element to provide a connection between the building element and the another building element. Such connection elements may impose further restrictions on possible placements of building elements, as a connection is only possible between compatible connection elements, e.g. protrusions that fit into corresponding cavities, when placed in a correct position relative to each other. Each connection element may have associated with it a connection element class, each connection element class having associated with it a connection strength. In some embodiments, the method comprises determining said associated connection strength value of an edge corresponding to a connection between two building elements from at least the number and respective classes of connection elements contributing to the corresponding connection. Consequently, an efficient and accurate method for calculating/estimating connection strengths in a building element model is provided.

In some embodiments, determining said associated connection strength value comprises determining the connection strength from at least the number and respective classes of connection elements contributing to the corresponding connection and from a volume of the two building elements, thereby not only taking the connection strength but also the size of the building elements into account, and thus whether the building elements are easy to hold and manipulate during the building process.

In some embodiments, determining at least one building element to disconnect from the previous part-model resulting in a new part-model comprises computing one or more weight functions for at least one of a subset of the building elements and a set of candidate sub-assemblies of building elements; and selecting one of a single building element and a sub-assembly based on a comparison of the computed weight functions. Consequently, a scalable, extendable, and flexible framework for the selection process is provided, which may be modified or extended by alternative or additional weight functions, and where different selection criteria may be weighted relatively to each other according to their importance/priority. The weight functions may include any suitable function of one or more properties of one or more building elements.

In some embodiments, at least one of the one or more weight functions has a range of possible results including a first sub-range indicative of a degree of adequateness to be disconnected and a second subrange indicative of a degree of inadequateness to be disconnected, thereby allowing both to assign positive and negative weights to building elements and/or sub-assemblies.

Accordingly, in some embodiments, selecting a single building element or sub-assembly based on a comparison of the computed weight functions includes computing a total weight from the one or more computed weight functions; wherein computing the total weight includes assigning a value in the second range to the total weight, if at least one of the computed weight functions has a result in the second range, thereby providing a veto-strategy preventing building elements and/or sub-assemblies from being disconnected that do not fulfil certain criteria, even though they may obtain a high weight from other weight functions.

Examples of weight functions that have been found to result in high-quality building instructions include a weight function determining whether a building element or sub-assembly is physically detachable or whether the direction of disconnection of said building element or sub-assembly is e.g. blocked by other parts of the model. For example, such a weight function may be efficiently calculated by computing a stretched geometry of the building element or sub-assembly.

Another example of such weight functions includes a weight function assigning a lower weight to articulation building elements and/or building elements that are comprised in an articulation pair of building elements or sub-assemblies, so as to avoid splitting up the model into disjoint/disconnected part-models. When the weight functions include a weight function that decreases with the number of other building elements the building element or sub-assembly is—directly or via other building elements—connected to, it is assured that small, disjoint parts are quickly removed from the model, if they occur.

When one of the weight functions is a function of a connection strength of connections between building elements of a sub-assembly, building elements and sub-assemblies that are easily disconnectable from the remaining model may be favoured. In particular, it has been found that a weight function that assigns a higher weight to building elements and sub-assemblies having a stronger internal connectivity and a weaker external connectivity, result in high-quality building instructions. Furthermore, in such a weight function, the connectivity strength may be calculated as a strength relative to the volume of the interconnected building elements or sub-assemblies.

Yet further examples of suitable weight functions include weight functions that are functions of at least a property of the building element or sub-assembly and a property of a building element or sub-assembly disconnected during a previous iteration of the iterative process, thus allowing to favour removal of symmetrically positioned building elements or sub-assemblies, building elements or sub-assemblies that are located in a proximity from another, and/or the like. Examples of such properties include the position of building elements relative to a coordinate system, a building element type, and/or the like. In some embodiments a weight function may further be a function of a property of more than one building element removed in previous iterations. For example, one or more of the earlier iterations could be assigned with different weights when comparing part-models; for example could the most recent iteration be assigned with a higher weight than the earlier iterations.

Embodiments of the method described herein receive a digital representation of the building element model. Such a digital representation may be provided by any suitable process, e.g. a computer-implemented construction environment and/or a process for generating a digital representation of a building element model from e.g. one or more images, such as images of a physical model or another object. One such process is described in U.S. Pat. No. 7,092,899. In this process a digital representation of a building element model of an item is created from a CAD model or a set of two-dimensional images of a three-dimensional item. Some embodiments of digital representations may include information indicative of the types, position, and/or interconnection of building elements, etc. in any suitable data format. Embodiments of digital representations may further include information about global model attributes, attributes of individual building elements, such as a building element type, color, size, bounding box, etc.

A computer-implemented construction environment for interactively constructing a virtual building element model may comprise a computer program that, when executed on a computer, provides a graphical user interface allowing a user to manipulate virtual building element models, including operations like selecting building elements, adding building elements to the model, deleting building elements from the model, changing the orientation of a building element, changing properties of a building element, e.g. color, type, size, and/or the like, viewing a model, saving a digital representation of a model, loading a digital representation of a previously saved model, etc. The virtual building elements may be virtual counterparts of corresponding physical building elements, i.e. have corresponding relative size, shape, color, etc.

A computer-implemented construction environment may be configured to enforce a predetermined set of restrictions imposed on the relative positions of building elements with respect to each other, such as collision detection between building elements. For example, the restrictions correspond to the corresponding restrictions applicable to the corresponding physical building elements, thereby ensuring that a virtual building element model actually can be constructed from the corresponding physical building elements as well. Hence, it is an advantage, that the method ensures that the generated building instructions actually are realisable, i.e. lead to a desired result.

In some embodiments, building instructions are generated as a sequence of graphical representations such as images. Each graphical representation may include a graphical rendering of a partial building element model also referred to as a part-model, thereby providing easy-to-follow building instructions where each graphical representation corresponds to a step in the building process where a predetermined number of building elements are added to the model. Thus, all part-models or only a subset of the part-models making up the determined construction sequence may be included in the final building instructions, as one or more steps of the construction sequence may be combined into a single image of the building instructions. A user can easily determine which building elements are to be added in each step and how they are to be added by comparing two consecutive graphical representations.

When the method further comprises providing a user interface for viewing the graphical representations, wherein the user interface preferably facilitates a user-controlled manipulation of the generated graphical representations, the digital representation of the building element model may be conveniently viewed on a computer. In particular, since the digital representation of the model includes all the information required for the generation of the building instructions, building instructions may conveniently be communicated from one computer to another, e.g. stored on a storage medium, sent via a communications network, e.g. as an e-mail attachment, uploaded on a web server, or the like. A recipient of the digital representation may thus view the graphical representation and manipulate it, e.g. change a viewing angle, zoom, change viewing options, and/or the like. Consequently, users may easily communicate their building instructions to friends. It is a further advantage that the digital representation does not need to include a graphical rendering of each step of the instructions, thereby keeping the file size of the digital representation small. Furthermore, since the digital representation may comprise all relevant model information, the recipient of a model may even modify the model before generating the building instructions.

In some embodiments, the building instructions may be generated in a predetermined file format, thereby allowing the generation of printed and/or electronic building instructions. Examples of suitable file formats include HTML, XML, BMP, TIFF, etc.

In some embodiments, the predetermined number of additional building elements added in a step of the step-wise instructions is user-selectable, thereby allowing a user to select between very detailed step by step instructions, wherein e.g. each step corresponds to the placement of a single new building element, and very compact instructions where each step corresponds to a larger number of newly placed building elements. In some embodiments the number of building elements added in each step is the same in all steps. In other embodiments, the number of additional building elements added may be different for different steps of the building instructions. For example, the step-size may be controlled by a user for each step, thereby allowing the generation of more fine-grained instructions for more complicated parts of the construction.

The present invention can be implemented in different ways including the method described above and in the following, a data processing system, and further product means, each yielding one or more of the benefits and advantages described in connection with the first-mentioned method, and each having one or more preferred embodiments corresponding to the preferred embodiments described in connection with the first-mentioned method and disclosed in the dependent claims related thereto.

In particular, the features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

Accordingly, the invention further relates to a data processing system adapted to perform the method described above and in the following. The invention further relates to a computer program comprising program code means for performing all the steps of the method described above and in the following when said program is run on a computer. The invention further relates to a computer program product comprising program code means for performing the method described above and in the following when said computer program product is run on a computer. The program code means may be stored on a computer readable medium and/or embodied as a propagated data signal.

In some embodiments, the computer program comprises a first software component for generating a digital representation of the building element model; and a second software component for generating building instructions from the generated digital representation, thereby providing a separate software component for reading the digital representation of a model and presenting the corresponding building instructions. Consequently, when communicating the building instructions a user may communicate the digital representation together with the second software component, thereby providing a compact, self-contained representation of the building instructions that can be viewed by the recipient without the need for additional software. It will be appreciated, however, that both processes, i.e. the generation of a digital representation of a model and the generation of the building instructions may be integrated in a single software component.

BRIEF DESCRIPTION OF THE DRAWINGS

The invention will be explained more fully below in connection with a preferred embodiment and with reference to the drawing, in which:

FIGS. 7A and 7B illustrates a representation of a building element model as an undirected graph;

FIGS. 8A, 8B, and 8C show examples illustrating embodiment of selection criteria.

FIG. 10 shows example illustrating embodiment of selection criteria.

FIGS. 11A and 11B show examples illustrating embodiment of selection criteria.

FIGS. 12A and 12B show examples illustrating embodiment of selection criteria.

FIG. 13 shows example illustrating embodiment of selection criteria.

DETAILED DESCRIPTION

Figure 1A:
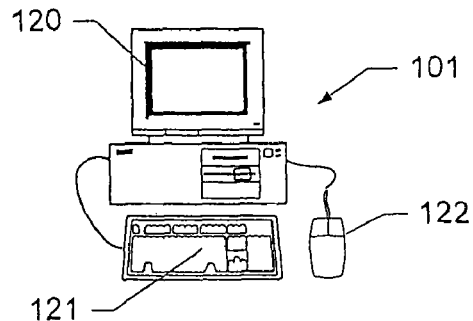
FIGS. 1A and 1B show a data processing system for generating building instructions of building element models.
Figure 1B:
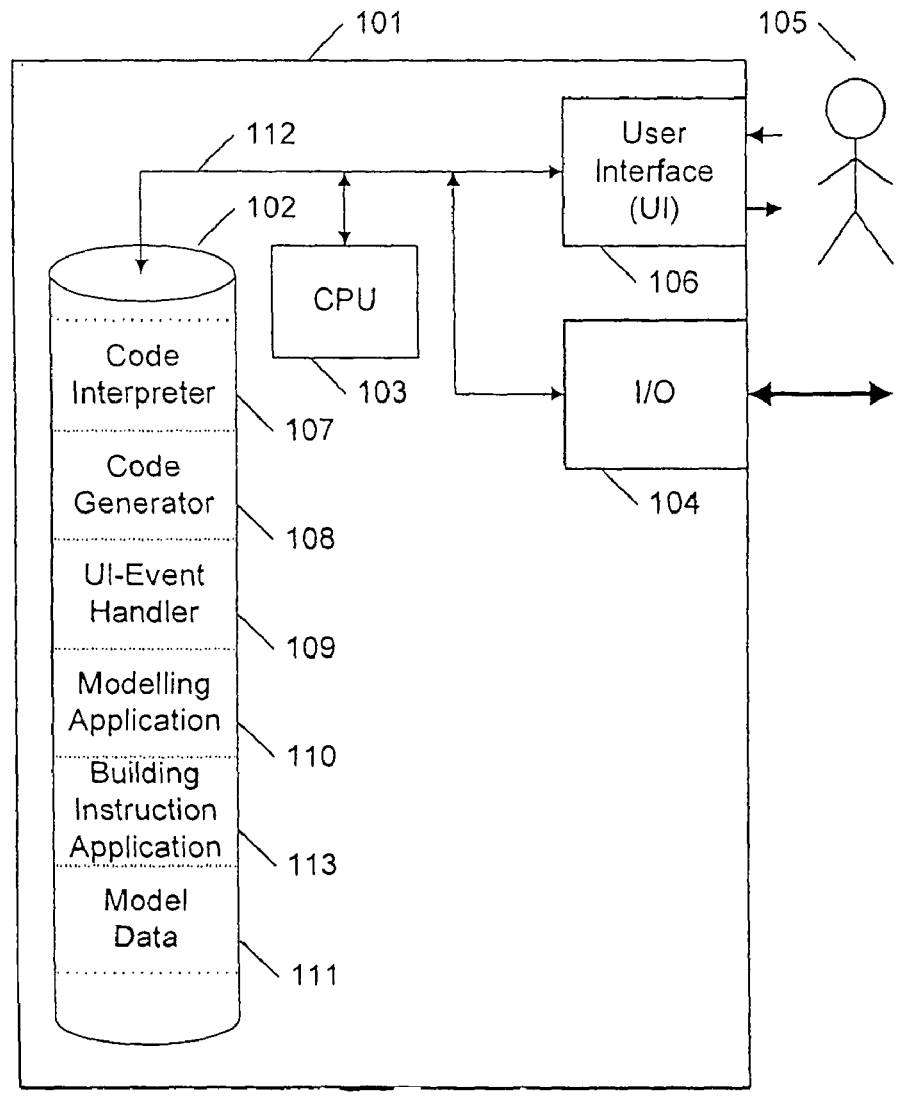

FIGS. 1a-b show a data processing system for generating and manipulating computer-readable models of geometrical objects.

FIG. 1a shows a schematic view of an example of a computer system. The computer system comprises a suitably programmed computer 101, e.g. a personal computer, comprising a display 120, a keyboard 121 and a computer mouse 122 and/or another pointing device, such as a touch pad, a track ball, a light pen, a touch screen, or the like.

The computer system designated 101 is adapted to generate building instructions from a digital representation of a building element model. The computer system 101 may further be adapted to facilitate designing, storing, manipulating, and sharing virtual building element models as well as generating building instructions as described herein. The computer system 101 can be used as a stand-alone system or as a client in a client/server system. In some embodiments, the computer system further comprises one or more interfaces for connecting the computer with a computer network, e.g. the Internet.

FIG. 1b shows a block diagram of a data processing system for generating building instructions for building element models. The computer 101 comprises memory 102 which may partly be implemented as a volatile and partly as a non-volatile memory means, e.g. a random access memory (RAM) and a hard-disc. The memory has stored thereon model code interpreter 107, model code generator 108, UI-event handler 109, modelling application 110, and building instruction generator 113, each executable by the central processing unit 103. Further, the memory has stored therein model data 111, i.e. a set of data structures representing a digital representation of a building element model.

The code interpreter 107 is adapted to read and interpret a digital representation defining a model, e.g. code representing the data structures of the building elements of a model. In a preferred embodiment the code interpreter is adapted to read a digital representation of the model and to convert such a model into a known graphic format for presentation on a computer display, preferably a 3D rendering of the model.

The UI-event handler 109 is adapted to convert a user's interaction with a user interface into proper user commands recognisable by the code generator 108. A set of possible and recognisable commands can comprise: Getting a building element from a library of elements, placing a building element to be connected to another building element, disconnecting a building element, discarding a building element, manipulating a building element, a group of building elements, etc., e.g. by initiating a rotation, etc. Along with each command, there may be associated a set of respective parameters, e.g. cursor coordinates with respect to the display coordinate system, types of building elements, etc.

The code generator 108 may further be adapted to modify the data structures of a model in response to a user's commands. As a concurrent or subsequent task, the code interpreter can be executed for presenting the result of the code generator.

The modelling application 110 is adapted to control memory, files, the user interface, etc.

An embodiment of a virtual reality modelling is described in U.S. Pat. No. 6,389,375. Furthermore, an embodiment of the process of interactively placing a new virtual building element into a scene including a 3D structure is described in published International application WO04104811. Both documents are incorporated herein by reference in their entirety.

The building instruction application 113 is adapted to read a digital representation of a model and to generate a building instruction from the read model data as described herein. The building instruction application 113 may further provide a user-interface for displaying part-models according to the stored sequence of building steps as described herein, or any other suitable output format for the generated building instructions. The building instruction application 113 may use functions provided by the code interpreter 107 and the UI-event handler 109 for the reading and graphical rendering of the models and for receiving user input, respectively. In alternative embodiments, the building instruction application is self-contained, i.e. not dependent on external software components. In some embodiments, the building instruction application generates the building instructions in a suitable file format, e.g. in printable form.

A user 105 is capable of interacting with the computer system 101 by means of the user interface 106, preferably comprising a graphical user-interface displayed on a computer screen, and one or more input devices such as a keyboard and/or a pointing device. In order to load, save, or communicate models, geometrical descriptions, or other data, the computer system comprises an input/output unit (I/O) 104. The input/output unit can be used as an interface to different types of storage media and different types of computer networks, e.g. the Internet. Further, the input/output unit (I/O) 104 can be used for exchanging models with other users e.g. interactively. Data exchange between the memory 102, the central processing unit (CPU) 103, the user interface (UI) 106, and the input/output unit 104 is accomplished by means of the data bus 112.

It is noted that the data processing system of FIG. 1 may be configured to execute both the modelling application and the building instructions application. However, in other embodiments the data processing system may be configured to only execute the building instruction application based on model data received from another computer, e.g. a computer on which a modelling application or another application for generating a digital model representation is executed. Likewise, on said other computer, the modelling application may be installed alone or in combination with the building instruction application.

Figure 2:
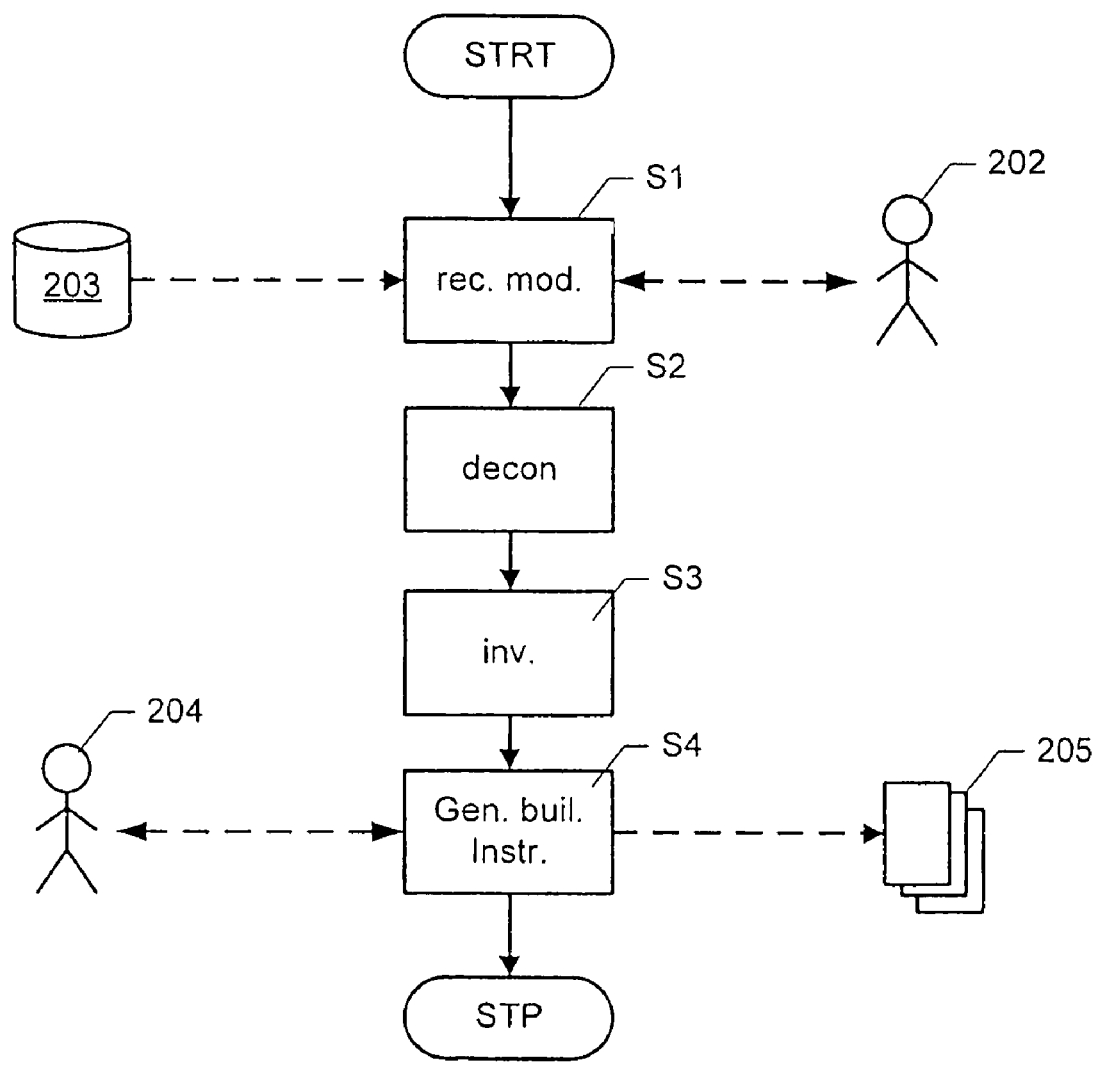
FIG. 2 shows a flow diagram of an embodiment of the overall building instruction generation.

FIG. 2 shows a flow diagram of an embodiment of the building instruction generation. In step S1, the process receives a digital representation of a building element model, e.g. as created by a model generation module, e.g. the modelling application 110 of FIG. 1b, or by any other suitable process.

The digital representation may be retrieved from a storage medium 203, e.g. the local hard disk of the computer running the building instruction application, a CD ROM, a diskette, or the like. Alternatively or additionally, the digital representation of the model may be stored remotely, e.g. e.g. received from another computer of a computer network where it is stored. For example, the digital representation may be downloaded from a web server, where it may be made available to one or more users. Examples of data structures of the digital representation will be described below.

In subsequent steps S2-S4, the building instruction application generates a building instruction 205 from the loaded digital representation. In one embodiment, the building instruction application generates a sequence of 3D views of part-models, where each part-model is distinguished from the immediately preceding part-model in that a predetermined number of additional building elements are added to the model according to a sequence of construction steps determined by the building instruction process as described herein. The building instructions 205 may be presented electronically, printed, or presented in another suitable way. In some embodiments, the generation of the building instructions may be controlled by a user 204. For example, the user may select the number of additional building elements to be added in each step. Furthermore, the user may manipulate the generated 3D views, including changes of a camera position, etc., as will be described below. The user 204 may be the same or a different user as user 202.

In particular, in step S2, the process generates a deconstruction sequence from the received digital representation of the model, e.g. in the form of a sequential list of building elements and/or sub-assemblies of the model. The process further generates sub-ordinate deconstruction sequences for the sub-assemblies of the sequential list. In one embodiment, the process represents the deconstruction sequence as a branched tree of steps where each branch may contain sub-ordinate building deconstructions. An embodiment of a process for generating a deconstruction sequence will be described in greater detail below.

In step S3, the process reverses the generated deconstruction sequence to obtain a construction sequence.

In step S4, the process generates building instructions from the generated construction sequence, e.g. as a sequence of images or other representations of part-models, where in each part-model one or more of the building elements and sub-assemblies from the generated list are added compared to the previous part-model. The process may store the generated instructions and/or output them in any suitable form as described herein.

Figure 3:
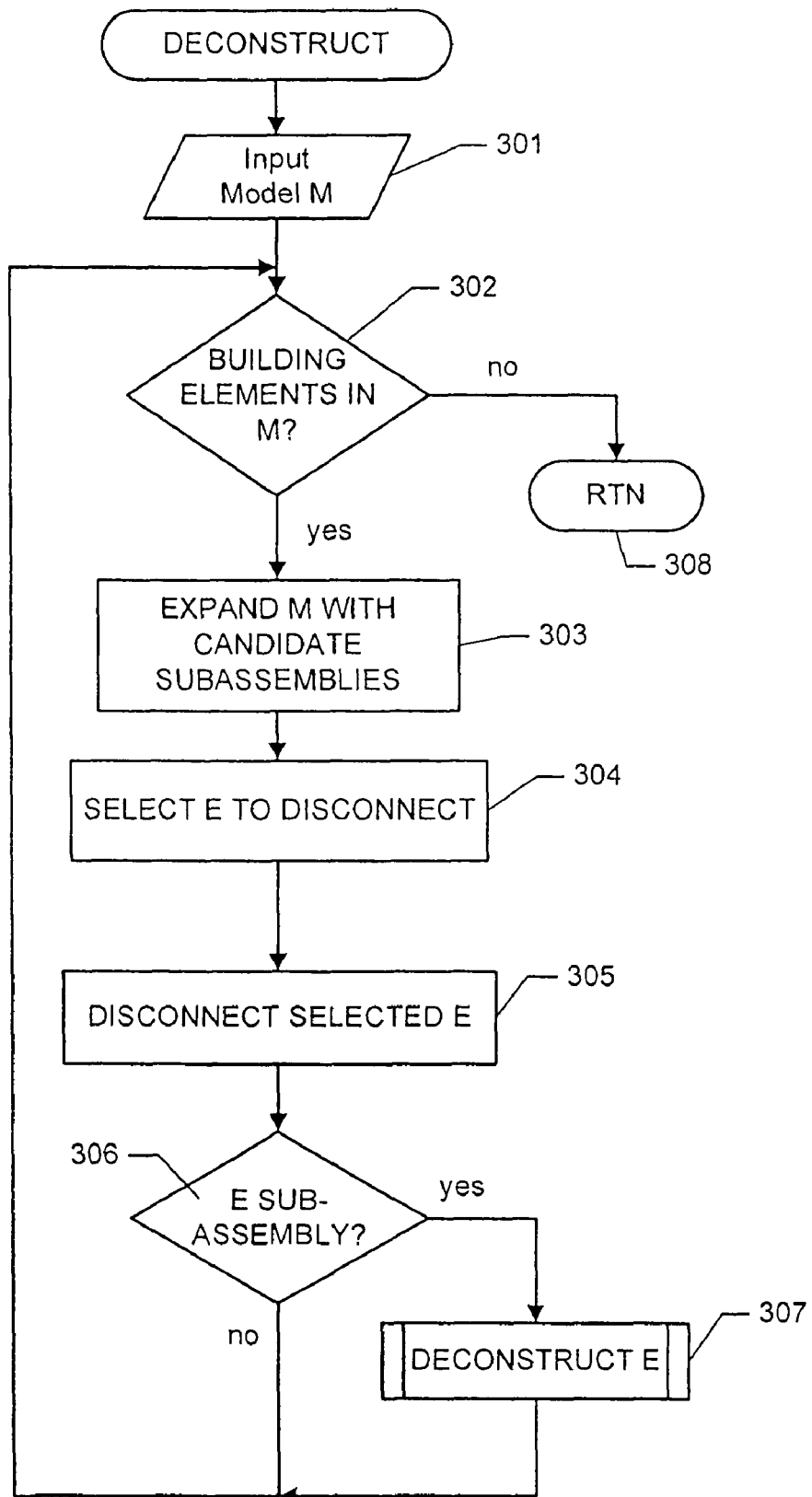
FIG. 3 shows a flow diagram of an embodiment of a process for generating a sequence of deconstruction steps.

FIG. 3 shows a flow diagram of an example of a deconstruction process of a model M. The deconstruction process deconstructs the model M on the basis of a digital representation of the complete model M, including all the building elements in the model (step 301). The input of the model M includes information about the individual building elements, such as size/dimensions, number of knobs, special features such as hinges, pegs, axles etc. of the building elements. The digital representation also includes information about where in the model each building element is placed, e.g. by specifying the respective (x,y,z) positions of the building elements with respect to a suitable coordinate system.

In step 302 the deconstruction process tests if there are building elements left in the model M (or a part-model resulting from a previous iteration) to be disconnected. If there are still building elements in the model, the process proceeds at step 303 where the process selects/generates one or more candidate sub-assemblies for removal from the model M. The candidate sub-assemblies include interconnected building elements. In subsequent step 304, the process selects a building element or one of the generated candidate sub-assemblies (E) to be disconnected according to a first set of predetermined selection criteria. This first set of predetermined selection criteria assign weights to every building element and generated sub-assembly according to predetermined weight functions, examples of which will be described more thoroughly below. Hence, the process determines a building element or sub-assembly from a pool of candidates, where the pool includes all individual building elements and the generated candidate sub-assemblies. Hence, for the purpose of the selection process, the sub-assemblies may be regarded as being treated as pseudo-building elements in addition to the actual building elements. For the purpose of the present description, members of the pool of building elements and candidate sub-assemblies will also be referred to as removal candidates.

The candidate sub-assemblies in step 303 are found/selected by means of a second set of selection criteria, which are a determination of how the model can be separated/cut. Examples of such selection criteria will be described more thoroughly below.

In step 305, the process disconnects the building element or sub-assembly E selected in step 304 from the model, i.e. generates a new part-model M'=M\E where the selected building element of all building elements of the selected candidate sub-assembly are removed. The process maintains a data structure indicative of the deconstruction sequence, and updates the data structure with information about the disconnected sub-assembly/building element. The sequence is stored, so it can be reversed afterwards to obtain a building instruction.

If the process selects a sub-assembly to be disconnected, the selected sub-assembly can be deconstructed by executing the deconstruction process in a recursive manner in step 307 (i.e. with the selected sub-assembly E serving as input model M), before returning to step 302 to continue the iterative deconstruction process and finding the next building element to disconnect from the remaining part-model, i.e. the model M'=M\E.

When there are no more building elements in the model, the model is completely deconstructed, and the deconstruction process stops in step 308.

It is an advantage of first selecting candidate sub-assemblies, which can be disconnected from the model and then afterwards assigning each candidate with weights according to how preferred it is to disconnect, that it is computationally possible to handle the selection, when separating it into more steps, since the weighting of sub-assemblies only is preformed on a subset of all possible sub-assemblies of the model.

An example of a deconstruction process is described by one of the inventors in the thesis "Computer-aided generation of building instructions for LEGO models", by Jacob Allerelli, Department of Mathematics and Computer Science, University of Southern Denmark, June 2006, which is incorporated herein by reference. In the In the following, examples of selection rules of the second set of selection criteria for determining candidate sub-assemblies in step 303 will be described in greater detail. These selection criteria will also be referred to as cut heuristics.

Minimal Cuts/Graph Partitioning:

It has been realized that suitable candidate sub-assemblies may be efficiently determined by using graph partitioning techniques for partitioning graphs into sub-graphs. To this end, the process represents the model in a data structure indicative of an undirected graph including nodes and edges connecting nodes, in which the nodes represent building elements and the edges represent connections between building elements. Such a graph will also be referred to as connectivity graph. An example of a connectivity graph is shown in FIGS. 7a-b. FIG. 7a shows an example of a building element model including building elements a, b, c, d, and e. FIG. 7b shows the corresponding connectivity graph with nodes a, b, c, d, e.

The edge data items of the graph data structure may include an attribute indicative of the (physical) connection strength of the corresponding connection between the building elements connected by the connection represented by the edge. So a graph partitioning process for identifying a minimal weight cut of the graph results in a sub-assembly such that the physical strength/force needed to disconnect the sub-assembly is at least approximately minimised. This way, the most loosely connected sub-assemblies are selected. An example of determining the connection strength between building elements will be described in greater detail below.

Building Direction Change:

It is advantageous to cut a model where a change in building direction occurs. Changes in building direction may occur when building elements are interconnected along at least two building directions. Positions of changes in building direction may be found by local graph-searches in the connectivity graph. A building direction may be defined by associating a direction attribute with each building element. Alternatively or additionally a building direction may be defined by assigning a direction attribute to the connections between building elements. To this end, the nodes and/or edges of the connectivity graph may have attributes associated with it indicative of a building direction of the corresponding connection.

Single Building Element Articulation Cuts:

Building elements which interconnect two or more sub-assemblies/building elements are called articulation building elements, and may be good cutting points/nodes for separation of the model. Once identified, an articulation building element can either be included in the separated sub-assembly, i.e. be removed, or the articulation building element can be excluded from the separated sub-assembly, i.e. not be removed. In the graph, articulation building elements can for example be flagged—e.g. by so-called graph coloring—and thereby easily located. Articulation nodes of the connectivity graph may be found by any suitable algorithm for finding articulation nodes of a graph, e.g. based on a depth first search (see e.g. "Graph Theory and Its Applications" by Jonathan L. Gross and Jay Yellen, Chapman & Hall/CRC, second edition, 2006).

Building Element Articulation Pair Cuts:

The term articulation pair refers to two building elements interconnecting two or more disjoint sub-assemblies, i.e. pairs of building elements whose removal causes the model to separate into two disjoint sub-assemblies. Sub-assemblies connected to the remainder of the model by articulation building elements or articulation pairs may be useful candidate sub-assemblies for the purpose of generating building instructions.

Articulation pairs can be found by a process where a list A of all articulation nodes in the connectivity graph G is saved. Then a graph G' is generated, where a non-articulation node n in G is removed. A list B of all articulation nodes in G' is saved. For every node m in B\A, the following articulation pairs are found: (n, m), This process is repeated for all non-articulation nodes n in the graph G.

Hinge or Joint Connection:

A hinge connection is a hinge between one or more building elements around a hinge direction. A building element may include an internal hinge or a hinge connection element for providing a hinge connection between two or more building elements. Sub-assemblies connected to the remainder of the model by a hinge connection may be useful candidate sub-assemblies for the purpose of generating building instructions. Such assemblies may be identified in the connectivity graph, when edges of the graph have associated attributes indicative of the presence of hinge structures. For example, the process may search for subgraphs of the connectivity graph that are connected to the remainder of the connectivity graph only by one or more hinge connections. FIG. 12b illustrates a building element having a connection element 1201 for providing a hinge connection. It will be understood, that other types of moveable connections may be useful for identifying candidate sub-assemblies as well, e.g. joint connections, sliding connections, etc.

Special Cases:

Some building elements are special in the way they are connectable to other building elements only in one way. Examples of these building elements are figures having a single connection element under the base of the figure, glass in windows, tires on wheels, train wagons on rails etc. These special building elements are therefore candidates which can be cut from the model at their external connection, i.e. where they are connected to an arbitrary building element different from their corresponding building element.

Hence, in the above, a number of cut-heuristics for identifying candidate sub-assemblies have been disclosed. One cut-heuristic or a combination of more cut-heuristics as described above may thus be used during the deconstruction process to efficiently find candidate sub-assemblies among the large number of all possible sub-assemblies of a model.

As described above, in one embodiment, each removal candidate—i.e. each of the building elements of the model and each of the candidate sub-assemblies which are selected by the above or alternative cut-heuristics process/es—is weighted by means of one or more weight functions so as to find the removal candidate with the highest weight, i.e. the removal candidate E most suitable to be removed from the model (step 304), and then this selected removal candidate is disconnected (step 305).

In one embodiment, the weight functions are selected such that each weight function will either enhance the chance of a building element/sub-assembly to be selected or it will reject the building element/sub-assembly from being selected, on basis of the criteria it implements. The process combines the results of all weight functions for each building element/sub-assembly so as to obtain an overall weight for the building element/sub-assembly. The process may then select the building element/sub-assembly with the highest weight. When the individual weighting functions are selected according to a uniform weighting scheme, the set of weighting functions is easily changeable.

For example, in one embodiment, each weight function results in a weight. A weight is either a real number in the range [0, . . . , 1] or a negative integer number (−1, −2, −3, . . . ). If disconnection of a building element/sub-assembly is favoured, the weight assigned to the building element/sub-assembly is in the range [0, . . . , 1], where 0 is assigned when it is neither disfavoured nor favoured to disconnect a building element/sub-assembly, and 1 is assigned when disconnection is optimum. The real numbers between these two extremes indicate a disconnection favouring in between. If disconnection is disfavoured, the weight function results in a negative weight assigned to the building element/sub-assembly in the range (−1, −2, −3, . . . ), where the different negative values indicate how disfavoured a disconnection is. It will be appreciated that other sets of weight functions may be defined having different ranges.

Weight functions having two separate ranges may be used to implement a veto scheme, e.g. as described below:

For each building element/sub-assembly x, each of a set of weight functions is evaluated, and the respective individual weights are combined as follows:

If there are no negative weights (so called "VETO"s) among the assigned weights for x, all weights are accumulated to obtain a total weight. If, on the other hand, there are one or more VETOs among the assigned weights, all non-VETO weights are discarded, i.e. set equal to 0. According to this, a good building element/sub-assembly to disconnect is one that is free of VETOs and has a high accumulated weight. On the other hand, once a building element/sub-assembly is given a VETO, it can not leave the VETO state until the next iteration in the deconstruction. If all building elements/sub-assemblies obtain negative weights, the process may select the building element with the total negative weight having the smallest absolute value. Alternatively, the process may backtrack one or more iterations and attempt to select a different building element/sub-assembly, request a user interaction, or proceed in another suitable way.

It has turned out that the above weighting scheme results in high-quality building instructions when a deconstruction is found where, in each step, there is at least one building element/sub-assembly which is free of VETOs.

A number of examples of weight functions will now be described in greater detail:

Detach Strategy:

One example of a weight function determines whether a building element/sub-assembly to be disconnected is physically accessible and detachable from the rest of the model. To this end, the weight function verifies whether one or more of the following two requirements are fulfilled:

All directions along which a building element/sub-assembly is detachable/connectable are parallel. This weight function may thus determine the building direction and/or the direction of connection of all connections of a building element, e.g. based on attributes associated with the corresponding node and/or edges in the connectivity graph. If all directions are parallel, the building element may be disconnected by a translational movement. For example, the building elements 803 of FIG. 8a have two directions of connection that are not parallel: They are connected to the axle 802 and to building element 804. The connection to the axle 802 has an associated direction parallel to the axle 802, since removing building element 803 from the axle 802 would require a movement of building element 803 in a direction along the axle 802. The connection to building element 804, on the other hand has a direction orthogonal to the axle, namely in the direction of the knobs protruding out of the top surface of building element 804. Hence removing building element 803 may cause strain to the model and be difficult to perform for e.g. a child without simultaneously disconnecting other connections of the model. FIGS. 12a-b shows examples of building elements with their respective directions of detachability indicated by arrows.

2) Moving a building element/sub-assembly in a direction of connection does not result in a collision with other building elements of the model. For example, the weight function may determine a bounding box of the building element/sub-assembly, and determine whether a translation of the bounding box for a predetermined distance in the direction of connection results in a collision/intersection with another building element. FIG. 13 illustrates a model in which building element 1301 is movable along its direction of detachability by a distance d. Alternatively, the weight function may calculate a building element/sub-assembly geometry stretched in the direction of connection, and determine whether the stretched geometry collides with any other building elements/sub-assemblies. How much space a building element takes up may be represented by simple geometrical volumes. For example, a building element with 2×4 knobs as e.g. shown in FIG. 4 may have associated with it 9 collision boxes: one collision box fills the entire building element except for the 8 knobs, and the 8 knobs fill a collision box each. This information can be utilised to estimate if building elements collide/overlap. The collision box information may be utilised to calculate the stretched form/shape/geometry which represents the space that is needed in order to disconnect a building element.

An example of how to calculate the stretched geometry/form/shape may comprise finding a direction, which is a vector d, in which the building element can be disconnected. The building element has N collision volumes (e.g. N=9 as in the example of the building element with 2×4 knobs above) and a position (x,y,z).

Having a building element BE, a vector d and the model M, the detach process may include the following steps: for every collision volume k in the BE, p1 denotes k's position. p2 denotes k's position when the BE is moved from p1 along the vector d. Since every collision volume is a box with 8 corners, there will be 8 points in p1 and 8 points in p2. In total there will be 16 points in a set of points. When the collision volumes are convex this set of points will constitute a convex figure f.

The process tests if the figure f collides with any building elements from the model M. If the figure f collides with any building elements from the model M, the building element BE can not be disconnected. If the figure f does not collide with any building elements in the model M, the process can test the next collision volume.

Finally, if none of the figures f of the N collision volumes collide with any building elements from the model M, the building element BE can be disconnected according to the detach strategy.

The effect of this strategy is that it assures at least approximately that the deconstruction (and thus the reverse construction) of the building element/sub-assembly is physically possible without putting physical strain on the model.

The following example of a weight function avoids disconnection of building elements/sub-assemblies that are physically not (or at least only easily) detachable:

Weight(x)=−1, if at least one of the above conditions 1) and 2) is not fulfilled for x,
0, otherwise Articulation Strategy:

As mentioned above, building elements/sub-assemblies whose removal causes the model to break up into two or more disjoint parts are called articulation building elements/sub-assemblies. Disconnection of articulation building elements/sub-assemblies may result in building instructions showing disjoint elements/sub-assemblies that appear to float/fly relative to each other in a 3D rendering of the building instructions. This may be undesirable, because it complicates the deconstruction and thereby also the building instruction.

The following weight function avoids disconnection of articulation building elements/sub-assemblies:

Weight(x)=−1 if x is an articulation building element/sub-assembly
0 if not

Hence, articulation building elements are strongly disfavoured, thus avoiding flying building elements/sub-assemblies.

In an alternative embodiment, the weight function assigns a neutral weight, e.g. weight=0 if x is an articulation building element/sub-assembly, and a positive weight, e.g. weight=1, if x is not an articulation building element/sub-assembly. Hence, in this embodiment the disconnection of articulation elements is neither disfavoured nor favoured. This shows that the different weights can be adjusted so as to adapt the weighting scheme to different desired effects. In yet another embodiment, different weights are assigned depending on whether the weight function is calculated for an individual building element or a sub-assembly. For example, in one embodiment, if x is a sub-assembly, weight(x) is set to −1 for articulation sub-assemblies and to 0, if x is not an articulation sub-assembly, while in the case of x being an individual building element, weight(x) is set to 0 for articulation building elements and +1 otherwise. Hence, in this embodiment, disconnection of an articulation sub-assembly is prevented, while disconnecting articulation building elements is merely disfavoured.

Integration Strategy:

There are situations where it is not possible to avoid disconnected (or "flying") building elements/sub-assemblies in the remaining part-model. An example of such a situation is shown in FIG. 8a, showing a gear element 801 positioned on an axle 802 which projects through corresponding holes of building elements 803. When deconstructing the model, the axle 802 may be removed, resulting in the gear element 801 to remain disconnected from the rest of the model, as shown in FIG. 8b.

In such a situation it may be desirable to remove the disconnected element 801 as soon as possible from the model, resulting in the situation shown in FIG. 8c.

The fast removal of disconnected elements may be favoured by a weight function assigning an increasing weight to building elements/sub-assemblies that are (directly or indirectly) connected to fewer other building elements: An example of such a weight function is:

Weight(x)=1/(number_of_building elements_connected_to_x+1) for all building elements/sub-assemblies x In the example of FIG. 8b, the above weight functions assigns the weight 1 to the little gear 801, since it is not connected to any other building elements or sub-assemblies. On the other hand, the other building elements are assigned with weight ⅙, because they are part of an assembly including the five elements designated 803, 804, and 805.

The integration strategy thus reduces the number of steps during which unavoidable "flying" building elements or sub-assemblies are shown in the resulting building instruction.

Similarity Strategy:

The similarity strategy is concerned with symmetries in construction/deconstruction. When employing a similarity strategy in the construction process, the construction may be likely to become symmetric, which will simplify the deconstruction process. In order to perform a deconstruction based on this, a function, which indicates how much two building elements A and B are "similar" can be determined as follows.

Weight functions determine A's and B's coordinates in a coordinate system where the y-axis corresponds to a principle building direction, e.g. a vertical direction. The x-axis and z-axis correspond to the other principal building directions, e.g. horizontal directions.

If B is the last building element which was disconnected, then a weight function for determining if A and B are similar, may have the following form:

Weight(x)=sum of
 a if A and B is the same type of building element
 b if A and B have the same x coordinate or the same z coordinate in the coordinate system
 c if A and B are having the same attributes (such as color, decoration etc.)
for predetermined weights a, b, c where a+b+c=1.

A weight higher than 0 reflects some degree of similarity. Alternative and/or additional criteria could also be considered.

The strategy is to disconnect a building element/sub-assembly, which is similar to the last building element/s or sub-assembly/ies disconnected. The effect of this strategy is that a model, which contains symmetrical parts, will often be symmetrically deconstructed.

Figure 9A:
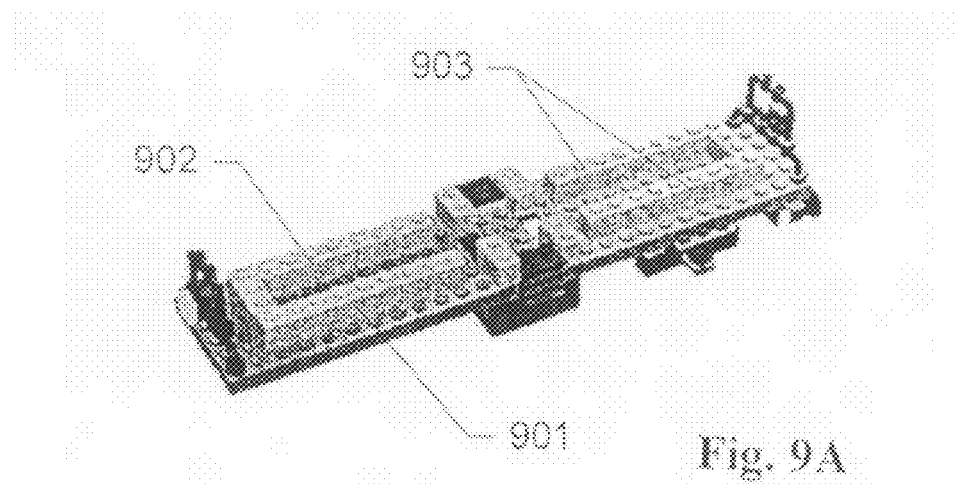
FIGS. 9A, 9B, and 9C show examples illustrating embodiment of selection criteria.
Figure 9B:
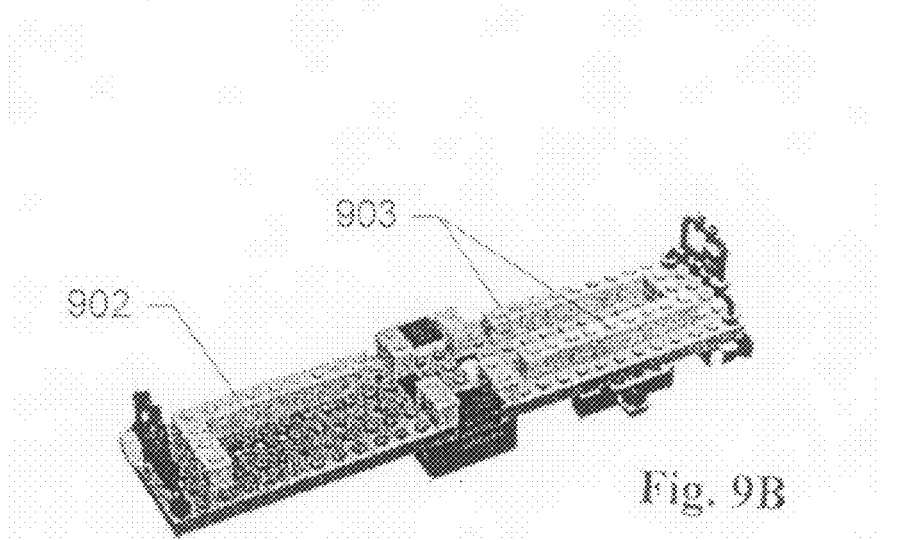
Figure 9C:
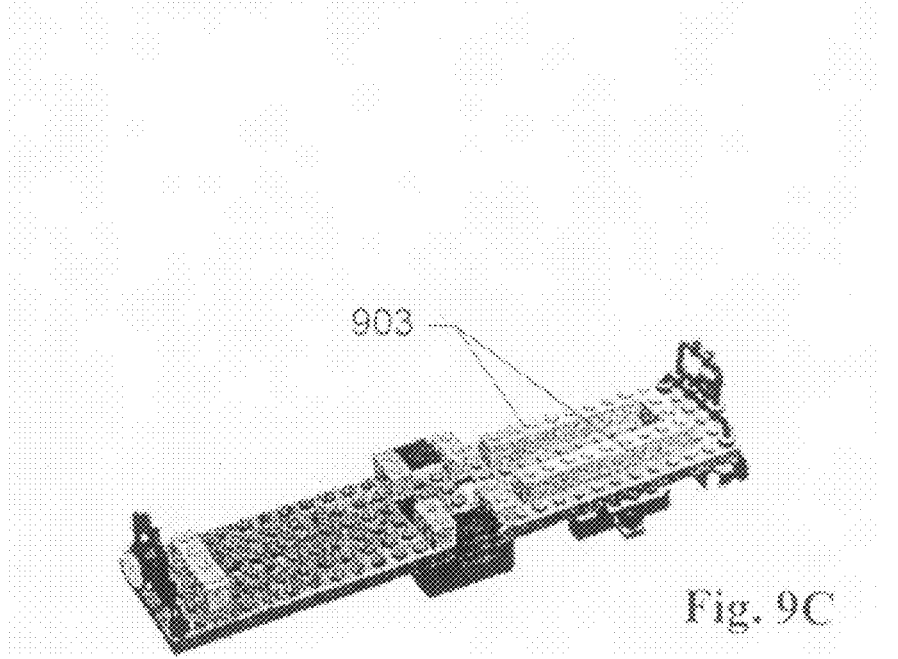

An example of the similarity strategy for deconstruction is given in FIGS. 9a-c illustrating an example of three consecutive deconstruction steps in FIGS. 9a-c, respectively. It is seen from FIGS. 9a-c that in the left part of the model, first an oblong building element 901 is disconnected and afterwards a similar oblong building element 902, which is placed in symmetrical relation to the first oblong building element, is disconnected. The next step could be to disconnect the two similar oblong building elements 903 in the right part of the model.

Foundation Strategy:

Special building elements or sub-assemblies, like big plates or irregularly shaped plates will often be a foundation/starter building element of the model, and will therefore be the last building element to disconnect. In order to examine whether a plate or other building element is a starter building element, the type and/or size of it can be compared with the type/size of the other building elements, or be compared with a threshold value indicating when a building element is large, since a starter building element will often be large, because it forms the foundation of the model. Furthermore, it can also be examined if a large building element is a starter building element by analysing how far down it is placed in the model. A building element being large and being placed in the bottom of the model is likely to be a starter building element. To this end, the nodes of the connectivity graph may have associated with them respective attributes indicative of the size/volume of the building elements. Alternatively, the building instruction process may allow a user to indicate a starter building element, e.g. by pointing out a starter building element with a mouse or another pointing device. Accordingly a weight function preventing starter building elements to be removed from the model may have the following form:

Weight(x)=−1 if x is a starter building element
0 if not.

Alternatively, the weight function may assign the weight 0 if x is a starter building element/sub-assembly thus indicating that the disconnection of x is not favoured, while assigning a high positive weight, e.g. weight=1 if x is not a starter building element/sub-assembly, because then disconnection is favoured.

The effect is that in the resulting building instruction some common foundation building elements or sub-assemblies will be connected initially or early in the construction process.

Substep Integrity Strategy:

According to one embodiment, for each candidate sub-assembly x, there are two contributing aspects which reflect/contribute to the quality of the connectivity. The first aspect is the strength of the internal connectivity between the building elements of the sub-assembly x, and the second aspect is the strength of the external connectivity of the building elements of the sub-assembly x. If the internal connectivity is relatively strong and the external connectivity is relatively weak, the sub-assembly may be expected to be easily removable, since the building elements in the sub-assembly are strongly connected to the other building elements in that sub-assembly, and only weakly connected to the rest of the model. Correspondingly, during the construction process a sub-assembly that has a strong internal connection and a weak connection to the rest of the model may relatively easy be constructed as a stable sub-assembly and connected to the remainder of the model without the risk that the sub-assembly breaks up during the attachment process.

In order to investigate how strongly a sub-assembly is internally connected, i.e. how the different building elements of the sub-assembly are connected to each other, the connectivity graph or another suitable representation of connectivity among all building elements may be used. The connectivity graph may include weights reflecting the physical strength among building elements, as described above, e.g. when each edge has an attribute/weight associated with it indicative of the strength of the corresponding connection.

Figure 4:
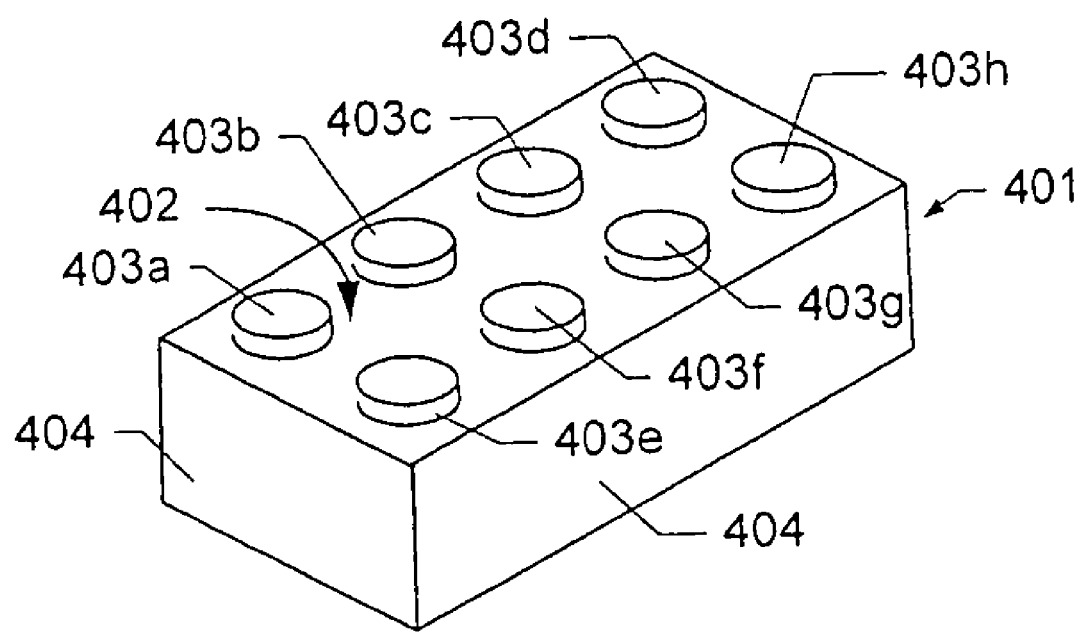
FIG. 4 illustrates an example of a building element and its connection elements.

For example, each building element may include one or more connection elements for engaging corresponding connection elements of other building elements so as to provide a connection between the building elements. For example, FIG. 4 shows an example of a building element with protrusions in the form of knobs adapted to engage holes (also referred to as anti-knobs) of another building element. In general, building elements may have connection elements of one or more different classes of connection elements, each class of connection element, or each pair of connection element classes, may provide a connection of a corresponding strength. The total strength of a connection between two building elements may thus be determined/estimated from the number of connection elements/pairs of cooperating connection elements that contribute to the connection between two building elements, and from the respective classes/types of the contributing connection elements. For example, the process may add the individual connection strengths to obtain a total connection strength. Information about the number and types of connection elements contributing to a connection may be obtained from the digital representation of the building element model and/or included in the nodes and/or edges of the connectivity graph. Examples of data structures supporting the definition of connection elements are described in WO 04/034333.

For example, the strength of a connection between building elements x and y may be calculated as follows:

$$\text{Strength}(x, y) = \sum_c S_c N(c)$$

Where the sum runs over all connection classes c, $S_c$ is the connection strength of connection class c, and $N(c)$ is the number of connection elements of class c contributing to the connection between x and y.

An example of how the physical strength of a connection may be determined between two building elements x and y of the type shown in FIG. 4 and having connection elements in the form of knob/anti-knob (or hole) pairs, pegs, and axles may be defined as follows:

Strenght(x,y)=Sum of:
  1 for each connecting knob/anti-knob pair
  10 for each peg
  5 for each axle It will be appreciated that the numerical values in the above example merely serve as an example.

The effective strength of the connectivity may be estimated even more accurately when the calculation of the effective strength further takes the geometry of the building elements into account.

For example, FIG. 10 shows two sub-assemblies, each including two building elements interconnected by a single connection element of the form described in connection with FIG. 4. However, while the sub-assembly of FIG. 10a is well connected, i.e. difficult to disassemble, the sub-assembly of FIG. 10b is not, as it would be very easy for a user to remove building element 1001 from the base plate 1002. The process can adjust for this difference by incorporating the volume or mass of the smallest/lightest building element relative to the strength of its connection. Alternatively or additionally another suitable quantity indicative of the geometrical properties of the building element may be used. This simulates how easy it is for e.g. a user to grab the building element with the user's fingers, since a large building element is easier to grab than a small building element.

Hence, such a modified weight function may be expressed as:

$$\text{Connection}(x,y) = \text{Strenght}(x,y)/\text{Minimum}(\text{volume of } x, \text{volume of } y)$$

So in the example shown in FIG. 10, the two sub-assemblies have the same strength between building elements, because in both cases the small building element is connected in one knob-antiknob pair. However, in the sub-assembly of FIG. 10a, the smallest building element 1003 has a smaller volume, while in the sub-assembly of FIG. 10b the smallest building element 1001 has a larger volume, so the function connection(x,y) will be largest for the sub-assembly of FIG. 10a.

An example of a weight function based on the above connectivity measure may be as follows:

$$\text{Weight}(x) = \begin{array}{l} -1 \text{ if } x \text{ is a sub-assembly and its weakest internal connection} < \\ \quad \text{internal threshold value} - 1 \text{ if } x \text{ a sub-assembly and} \\ \quad\quad \text{its strongest external connection} > \text{external 0 otherwise} \end{array}$$

The threshold values for the internal and external connections may be predetermined, user-controlled, empirically found or otherwise suitably set.

Adjusting the threshold values is an effective way of regulating the amount and quality of substeps in the resulting building instruction. By setting the threshold values to relatively high values, few candidate sub-assemblies of high quality can be obtained instead of obtaining many of lower quality. This makes the deconstruction process easier and faster.

Closest Strategy:

Building elements/sub-assemblies can also be assigned a weight according to their distance from the previously disconnected building element/sub-assembly. More specifically, the weight(x) may be a function of the distance, the squared distance, or another suitable distance measure of the centre of mass of x to the centre of mass of the building element/sub-assembly, which was previously disconnected. It will be understood that instead of the centre of mass, another suitable reference point of the building elements/sub-assemblies may be used.

Building elements which are closer to the previously disconnected building element/sub-assembly may be given higher weight. When building elements are contacting each other in at least one point, the distance between them may be set to zero. The closest strategy may differentiate between building elements abutting each others surfaces and building elements just contacting each other in their corners, as illustrated in FIG. 11a and FIG. 11b, respectively. In one embodiment, a weight function may thus be an increasing function of the size of the area of abutment between two building elements. Whether or not building elements abut each other or are otherwise in contact with each other may be determined based on bounding box or other geometrical information stored as part of the digital representation. A way of approximating such a measure is by calculating the largest distance between points of the respective building elements. The larger this distance is the smaller is generally the area of abutment as illustrated by FIGS. 11a-b.

Stacking Strategy:

When building a model it will often be preferable to build from the bottom and upwards. Therefore a weight may be assigned to a building element/sub-assembly according to its distance from the lowest building element in the model. The farther away a building element/sub-assembly is from the bottom, the higher a weight it will be assigned within the deconstruction process. Hence, in general a weighting function may be an increasing function of the coordinates of a building element along one or more directions of a coordinate system.

Hence, in the above a number of examples of weight functions have been described, each corresponding to a corresponding model deconstruction strategy. It will be understood that a deconstruction process may include alternative or additional weight functions and/or alternative or additional deconstruction strategies. Furthermore, alternative and/or additional weight functions may be defined corresponding to the deconstruction strategies described herein.

It will further be appreciated that some of the strategies described herein have one or more parameters which can be varied to boost one aspect or another of the outcome, thereby making the framework a tool for generating building instructions by human interaction, rather than a black-box.

The inventors have obtained particularly good results with a combination of weight functions corresponding to the following strategies in ensuring the integrity of the building deconstruction. Together they may form the backbone of an embodiment of an automatic building instruction generator that provides good results without the need for user interaction:

Detach strategy: Only allow disconnecting building elements or sub-assemblies that are physically possible to remove, given the geometry and connectivity of the building element or sub-assembly.

Substep integrity strategy: Only allow disconnecting assemblies which are strongly connected internally, and weakly connected externally. The exact requirement can be varied to ensure sub-steps of desired quality, as described above.

Articulation strategy: Only allow disconnecting sub-assemblies which do not split the model into two or more disconnected assemblies. Moreover, disfavour disconnecting individual building elements which split the model into two or more disconnected sub-assemblies.

Integration strategy: If an individual articulation building element was removed, remove disconnected building elements or sub-assemblies as soon as possible.

In one embodiment, the above mentioned four strategies—detach, substep integration, articulation and integration—are used for all construction/deconstruction, whereas one or more further strategies, e.g. one or more of the remaining strategies described herein e.g. similarity, foundation, closest and stacking may be used to adjust the result in different situations. Such strategies may be selectable by a user.

FIG. 4 illustrates an example of a building element and its connection elements. In particular, FIG. 4 shows a perspective view of a building element 401. The building element 401 has a top surface 402 with eight knobs 403a-h that can engage with corresponding holes of another building element, e.g. holes on the bottom surface of another building element. Correspondingly, building element 401 comprises a bottom surface (not shown) with corresponding holes. The building element 401 further comprises side faces 404 that do not comprise any connection elements.

Generally, the connection elements may be grouped into different classes of connection elements, e.g. connectors, receptors, and mixed elements. Connectors are connection elements which may be received by a receptor of another building element, thereby providing a connection between the building elements. For example, a connector may fit between parts of another element, into a hole, or the like. Receptors are connection elements which can receive a connector of another building element. Mixed elements are parts that can function both as a receptor and a connector, typically depending on the type of the cooperating connection element of the other building element.

Building elements of the type illustrated in FIG. 4 are available under the name LEGO in a large variety of shapes, sizes, and colors. Furthermore, such building elements are available with a variety of different connection elements. It is understood that the above building element merely serves as examples of possible building elements.

Figure 5:
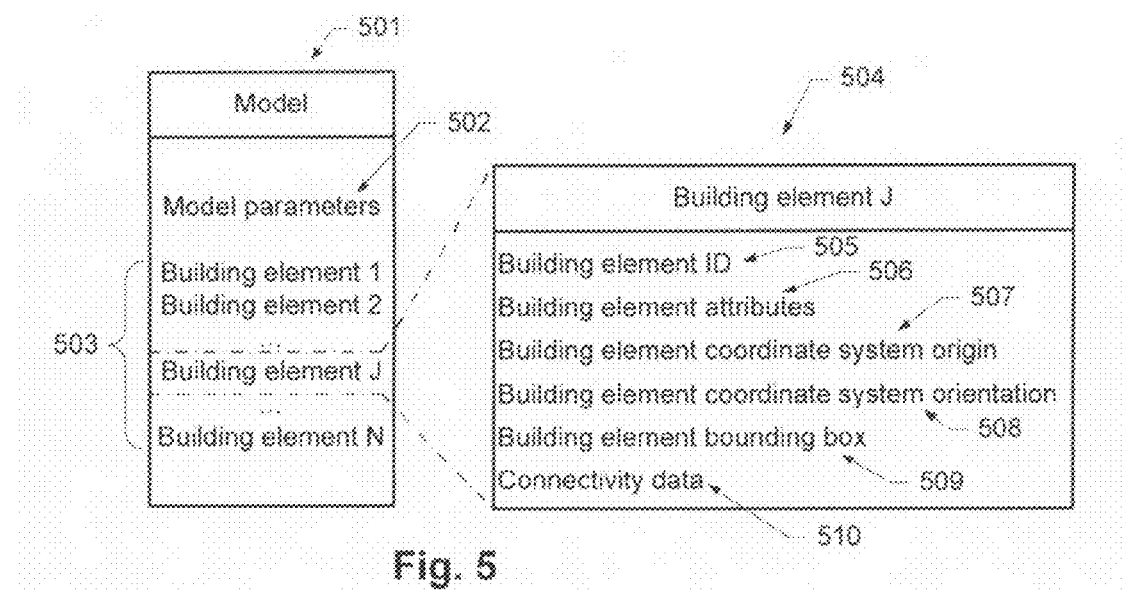
FIG. 5 illustrates an embodiment of a data structure for digitally representing a building element model

FIG. 5 illustrates an embodiment of data structure for digitally representing a building element model. The data structure 501 may comprise one or more data records 502 including global model parameters relating to the entire model. Examples of such model parameters include a model name, a name of a model creator, a program version number of the modelling application, a creation date, etc. The model data structure 501 further comprises a list 503 or other suitable structure of building element data records. In the example of FIG. 5, the list comprises N data records "Building element 1", "Building element 2", . . . , "Building element J", . . . , "Building element N". Each building element data record of the list 503 has the structure illustrated by the data structure 504 for "Building element J".

In particular, each building element data record comprises a building element ID 505, indicating an identifier corresponding to the type of building element. The building element ID may uniquely identify the properties of the building element or type of building element.

The building element data record may further comprise a number of building element attributes 506 indicating one or more attributes of the building element, such as color, texture, decorations, etc.

Furthermore, the building element data record 504 comprises data items 507 and 508 representing the position and orientation of an internal coordinate system of the building element, respectively. The position and orientation of the building element are defined by the coordinates of an origin of the internal coordinate system of the building element with respect to a global "world" coordinate system, and by the orientation of the internal coordinate system with respect to the global coordinate system.

An example of a data format for storing building element models that includes a hierarchy of coordinate systems is disclosed in U.S. Pat. No. 6,389,375.

Furthermore, the building element data record 504 may comprise data items 509 and 510 representing one or more bounding boxes and connectivity data of the building element, respectively, used in the detection of connectivity properties of the building element with other building elements. An embodiment of a representation of the connectivity data of the type of building elements shown in FIG. 4 includes data structures representing the planes defined by the surface of a bounding box of the building element. The connection elements of the building element are located in these planes, such that each connection element has an axis associated with it. The axes of all connection elements in the same plane correspond to respective grid points of a regular grid, e.g. an orthogonal grid, with fixed distances between neighbouring grid points. The planes associated to the building element 401 of FIG. 4 are pairwise parallel to each other, and they include a set of horizontal planes corresponding to the top and bottom faces of the building element and a number of vertical planes corresponding to the side faces of the building element. The distances between neighbouring grid points may be the same in all horizontal planes. In some embodiments, the distances between neighbouring grid points in vertical planes are different from the distances between neighbouring grid points in horizontal planes. A digital representation of the connectivity properties of the building elements of the type shown in FIG. 4 are disclosed in WO 04/034333 which is incorporated in its entirety herein by reference.

It is understood that the digital representation may be encoded in any suitable data or file format, e.g. as a binary file, as a text file according to predetermined modelling description language, or the like. It will further be understood that other embodiments of digital information may utilise alternative or additional data structures and/or represent alternative or additional model data.

Figure 6:
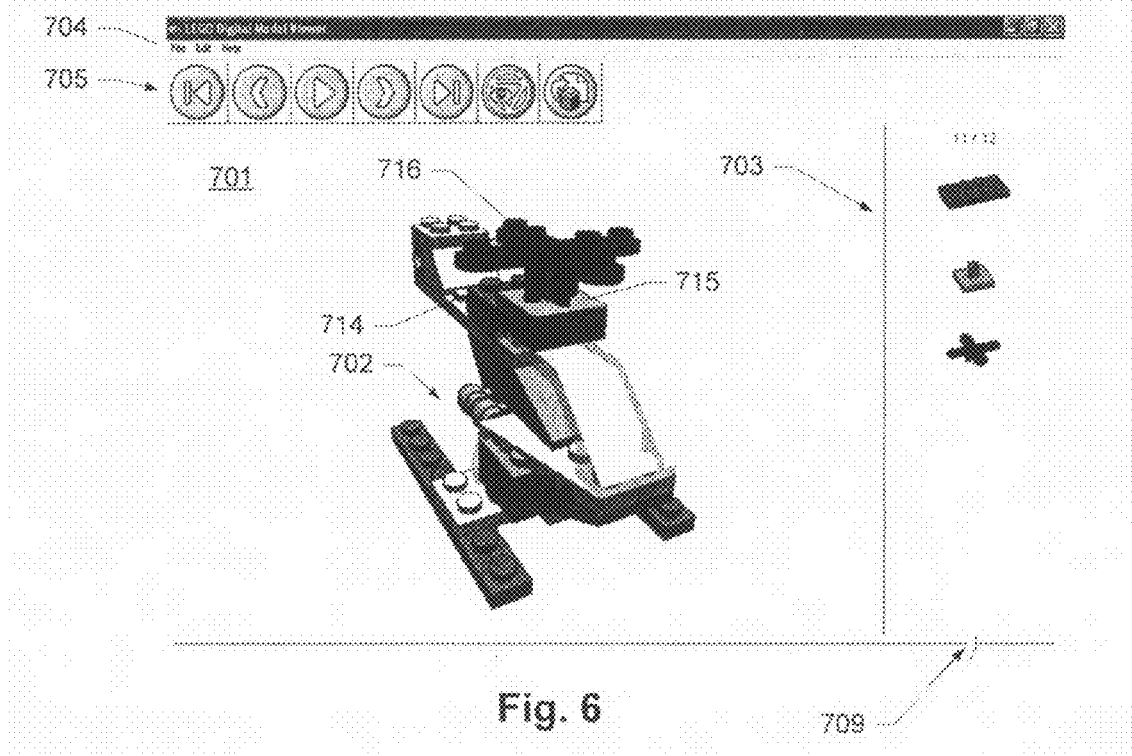
FIG. 6 illustrates an embodiment of a graphical user-interface of a building instruction application.

FIG. 6 illustrates an embodiment of a graphical user-interface of a building instruction application program. The user-interface comprises a viewing area 701 illustrating a graphical representation of a step of a set of step-by-step building instructions. The graphical representation shows a 3D view of a part-model 702 shown from a predetermined camera position. The part-model 702 consists of a subset of all the building elements of the complete model, where the subset includes the initially positioned building elements. The viewing area 701 further comprises a graphical representation 703 of the most recently placed building elements, i.e. the building elements that distinguish the present part-model 702 from the part-model of the previous step. In this example, these are the building elements 714, 715, and 716 of the part-model 702.

The user-interface further comprises a slider control element 709 which may be moved in discrete intervals by a corresponding drag operation with the mouse, allowing a user to select any of the steps of the step-by-step instructions. In the example of FIG. 6, three new building elements are added in each step of the instructions.

The user-interface further comprises button control elements 705 that allow a user to invoke a number of frequently used functions such as sequentially flipping through the graphical representations in a forward and backward direction, respectively, jumping to the first and last step of the instructions, changing the camera position, printing the generated building instructions, and initiating an "auto-play" function. The auto-play function displays the sequence of part-models one by one such that each part-model is shown for a predetermined period of time. Preferably, the user may configure the viewing time for each part-model in the auto-play function.

Finally, the user interface comprises a number of pull-down menus 704, allowing a user to initiate functionality such as a help function, functions for changing the camera position, zoom functions, etc. Further functionality provided by the building instruction application includes the loading of digital representations, a print function for printing the graphical representations of the part-models, and export functions for exporting the sequence of graphical representations of the part-models, e.g. in a HTML format, or any other suitable graphical file format, such as TIF, JPG, BMP, etc.

Further examples of functions provided by the building instruction application include a bill of material function, allowing a user to view or print a list of all building elements in the model.

The invention claimed is:

1. A computer-implemented method of generating building instructions for a building element model for construction of an assembled toy, the model including a plurality of building elements, the method comprising:
determining, from a computer based digital representation of the building element model of the assembled toy, a sequential order of deconstruction steps for deconstructing the building element model into building elements, each deconstruction step including removing at least one building element from the building element model;
inverting, using the computer, the determined sequential order of deconstruction steps to generate a sequential order of construction steps for constructing the building element model of the assembled toy, each construction step including adding at least one building element to the building element model; and
generating, using the computer, building instructions for the building element model for construction of the assembled toy, based on the sequential order of construction steps generated.

2. A method according to claim 1, wherein the building elements are mutually interconnected.

3. A method according to claim 1, wherein determining the sequential order of deconstruction steps comprises performing an iterative process, wherein an iteration of the iterative process comprises:
obtaining a previous part-model resulting from a previous iteration;
determining at least one building element to disconnect from the previous part-model resulting in a new part-model.

4. A method according to claim 3, wherein determining at least one building element includes:
determining a set of candidate sub-assemblies of the previous part-model, each candidate sub-assembly including respective interconnected building elements of the previous part-model;
selecting, according to a first set of predetermined selection criteria, either a single building element or one of the determined set of candidate sub-assemblies to be disconnected from the previous part-model resulting in the new part-model.

5. A method according to claim 4, wherein determining the set of candidate sub-assemblies comprises selecting the candidate sub-assemblies according to a second set of selection criteria.

6. A method according to claim 5, wherein at least one of the second set of selection criteria includes determining a connection strength of the connection of one or more of the candidate sub-assemblies with the previous part-model.

7. A method according to claim 5; wherein the building elements are interconnectable along at least two building directions; and wherein at least one of the second set of selection criteria includes determining one or more positions in the previous part-model where a change in building direction occurs.

8. A method according to claim 5, wherein one or more building elements include a connector element for providing a movable connection around at least one direction; and wherein at least one of the second set of selection criteria includes determining one or more sub-assemblies movably connected to the previous part-model.

9. A method according to claim 4, further comprising determining a sequence of deconstruction steps for each sub-assembly selected for removal during an iteration of the iterative process.

10. A method according to claim 3, comprising representing the previous part-model by a data structure indicative of a graph including nodes indicative of respective building elements of the previous part-model and edges connecting respective nodes indicative of connections between corresponding building elements.

11. A method according to claim 10, wherein an edge of said graph has an associated connection strength value indicative of a connection strength of a connection between building elements corresponding to nodes connected by said edge.

12. A method according to claim 11, wherein each building element comprises one or more connection elements adapted to engage with one or more corresponding connection elements of another building element to provide a connection between the building element and the another building element, each connection element having associated with it a connection element class, each connection element class having associated with it a connection strength; and wherein the method comprises determining said associated connection strength value of an edge corresponding to a connection between two building elements from at least the number and respective classes of connection elements contributing to the corresponding connection.

13. A method according to claim 11, wherein determining said associated connection strength value comprises determining the connection strength from the number and respective classes of connection elements contributing to the corresponding connection and from a volume of the two building elements.

14. A method according to claim 10, comprising performing a graph partitioning process to determine a set of candidate sub-assemblies of the previous part-model.

15. A method according to claim 10, wherein an edge of said graph has an associated value indicative of a building direction of a connection between building elements corresponding to nodes connected by said edge.

16. A method according to claim 10, comprising identifying one or more articulation nodes of said graph so as to determine a set of candidate sub-assemblies of the previous part-model.

17. A method according to claim 10, comprising identifying one or more articulation pairs of nodes of said graph so as to determine a set of candidate sub-assemblies of the previous part-model.

18. A method according to claim 10, wherein one or more building elements include a connector for providing a movable connection around at least one direction; and wherein at least one of a node and an edge of said graph has an associated value indicative of a presence of a movable connection.

19. A method according to claim 3, wherein determining at least one building element to disconnect from the previous part-model resulting in a new part-model comprises computing one or more weight functions for at least one of a subset of the building elements and a set of candidate sub-assemblies of building elements; and selecting one of a single building element and a sub-assembly based on a comparison of the computed weight functions.

20. A method according to claim 19, wherein at least one of the one or more weight functions has a range of possible results including a first sub-range indicative of a degree of adequateness to be disconnected and a second sub-range indicative of a degree of inadequateness to be disconnected.

21. A method according to claim 20, wherein selecting a single building element or sub-assembly based on a comparison of the computed weight functions includes computing a total weight from the one or more computed weight functions; wherein computing the total weight includes assigning a value in the second range to the total weight, if at least one of the computed weight functions has a result in the second range.

22. A method according to claim 19, wherein each building element includes one or more connection elements for engaging with one or more corresponding connection elements of another one of the building elements; wherein each connection element defines a direction of disconnection along which the building element is disconnectable from another building element; and wherein calculating a first one of the one or more weight functions for a building element or sub-assembly comprises determining whether the respective directions of disconnection of all connectors of the building element or sub-assembly that are connected to one or more other building elements of the previous part-model are parallel to each other.

23. A method according to claim 22, wherein calculating the first weight function for a building element or sub-assembly further comprises determining a minimum distance between the building element or sub-assembly to any other building element or sub-assembly of the previous part-model in a direction of disconnection.

24. A method according to claim 22, wherein calculating the first weight function for a building element or sub-assembly further comprises
  determining a stretched geometry of the building element or sub-assembly, wherein the stretched geometry is stretched in a direction of disconnection, and
  determining whether the stretched geometry intersects with any other building element or sub-assembly of the previous part-model.

25. A method according to claim 19, wherein calculating a second one of the one or more weight functions for a building element or sub-assembly further comprises determining whether the building element or sub-assembly is an articulation building element or sub-assembly.

26. A method according to claim 19, wherein calculating a third one of the one or more weight functions for a building element or sub-assembly further comprises determining whether the building element or sub-assembly is a part of an articulation pair of building elements or sub-assemblies.

27. A method according to claim 19, wherein a fourth one of the one or more weight functions for a building element or sub-assembly is a function that decreases with the number of other building elements the building element or sub-assembly is connected to.

28. A method according to claim 19, wherein a fifth one of the one or more weight functions is a function of a connection strength of connections between building elements of the sub-assembly.

29. A method according to claim 28, wherein calculating the fifth weight function comprises determining a weakest connection strength between interconnected building elements of the sub-assembly, and wherein the fifth weight function is a decreasing function of the determined weakest connection strength.

30. A method according to claim 19, wherein a sixth one of the one or more weight functions is a function of a connection strength of connections of building elements of the sub-assembly with other building elements of the previous part-model.

31. A method according to claim 30, wherein calculating the sixth weight function comprises determining a strongest connection strength between the building elements of the sub-assembly and one or more other building elements of the previous part-model not included in the sub-assembly, and wherein the sixth weight function is a decreasing function of the determined strongest connection strength.

32. A method according toy claim 19, wherein a seventh one of the one or more weight functions of a building element or sub-assembly is a function of a coordinate of a position of the building element or sub-assembly along a predetermined direction relative to a coordinate system.

33. A method according to claim 19, wherein an eighth one of the one or more weight functions of a building element or sub-assembly is a function of at least a property of the building element and subassembly and a property of a building element or sub-assembly disconnected during a previous iteration of the iterative process.

34. A method according to claim 33, wherein the eighth weight function is a function of a distance between the building element or sub-assembly and a building element or sub-assembly disconnected during a previous iteration of the iterative process.

35. A method according to claim 33, wherein the eighth weight function is a function of a predetermined measure of similarity indicative of at least a predetermined spatial relationship between the building element or sub-assembly and a building element or sub-assembly disconnected during a previous iteration of the iterative process, and a comparison of one or more attributes associated with the building element or sub-assembly and a building element or sub-assembly disconnected during a previous iteration of the iterative process.

36. A method according to claim 1, wherein the digital representation includes respective position coordinates of each of the building elements with respect to a predetermined coordinate system.

37. A method according to claim 1, further comprising generating the digital representation of the building element model by means of a computer-implemented construction environment for interactively constructing a virtual building element model.

38. A method according to claim 1, comprising generating a sequence of graphical representations of a corresponding sequence of part-models including an initial part-model, a sequence of incremental part-models, and a complete model; wherein each of the incremental part-models includes all building elements of the immediately preceding incremental part-model of the sequence and a predetermined number of additional building elements from the plurality of building elements, wherein the additional building elements are determined by the determined sequence of construction steps.

39. A method according to claim 38, further comprising providing a user interface facilitating a user-controlled manipulation of the generated graphical representations.

40. A computer program product comprising a non-transitory computer readable medium having stored thereon program code means adapted to cause a data processing system to perform the steps of the method according to claim 39, when said program code means are executed on the data processing system.

41. A data processing system having stored thereon program code means adapted to cause the data processing system to perform the steps of the method according to claim 1, when said program codes means are executed on the data processing system.

42. A computer program product comprising a non-transitory computer readable medium having stored thereon program code means adapted to cause a data processing system to perform the steps of the method according to claim 1, when said program code means are executed on the data processing system.

* * * * *